United States Patent [19]

Blegen

[11] 4,374,181
[45] Feb. 15, 1983

[54] VAPOR PERMEATION CURABLE COATINGS FOR REACTION INJECTION MOLDED PARTS

[75] Inventor: James R. Blegen, Worthington, Ohio

[73] Assignee: Ashland Oil, Inc., Dublin, Ohio

[21] Appl. No.: 302,185

[22] Filed: Sep. 14, 1981

[51] Int. Cl.³ ............................................. B05D 3/10
[52] U.S. Cl. ................................ 428/423.3; 427/340;
427/393.5; 428/423.1; 428/424.2; 428/425.1;
524/377; 525/440; 528/80; 528/83
[58] Field of Search ............................ 427/340, 393.5;
260/31.2 T, 31.2 XA, 31.6, 31.8 R, 31.8 XA,
31.8 N; 428/425.1, 424.2, 423.1, 423.3; 528/80,
83; 524/377; 525/440

[56] References Cited

U.S. PATENT DOCUMENTS

| | | | |
|---|---|---|---|
| 2,657,151 | 10/1953 | Gensel | 427/340 |
| 2,967,117 | 1/1961 | Arledier et al. | 427/340 |
| 3,409,579 | 11/1968 | Robins | 260/30.4 |
| 3,429,848 | 2/1969 | Robins | 260/38 |
| 3,676,392 | 7/1972 | Robins | 260/38 |
| 3,789,044 | 1/1974 | Taft et al. | 260/18 TN |
| 3,822,226 | 7/1974 | Taft et al. | 260/18 TN |
| 3,836,491 | 9/1974 | Taft et al. | 260/22 TN |
| 3,874,898 | 4/1975 | McInnes et al. | 427/340 |
| 3,933,727 | 1/1976 | Schmid | 260/37 |
| 4,179,427 | 12/1979 | Gardekes | 260/29.2 TN |
| 4,267,239 | 5/1981 | Thankachan | 428/425.1 |
| 4,298,658 | 11/1981 | Thankachan | 428/425.1 |

FOREIGN PATENT DOCUMENTS 1351881  5/1974 United Kingdom .
1369351 10/1974 United Kingdom .

OTHER PUBLICATIONS

Taft et al., "Vapor Permeation Curing" FATIPEC Congress, 11 1972, pp. 335-342.

Primary Examiner—Norman Morgenstern
Assistant Examiner—Janyce A. Bell
Attorney, Agent, or Firm—Mueller and Smith

[57] ABSTRACT

Disclosed is a coating composition rapidly curable at room temperature in the presence of a vaporous tertiary amine catalyst which coating composition is ideally suited for coating reaction injection molded (RIM) urethane parts, upholstery vinyl, and sheet molding compound (SMC). The flexible coating composition of the present invention preferably comprises an aromatic hydroxyl-functional condensation product, a multi-isocyanate curing agent, and a volatile organic solvent therefor. The aromatic hydroxyl functional condensation product is made from (a) a linear aliphatic dibasic acid, (b) a linear aliphatic glycol, (c) a combination of a linear aliphatic glycol and aromatic dicarboxylic acid, and (d) a phenol capping agent. The sum of the methylene groups of the linear aliphatic dibasic acid (a) and linear aliphatic glycol (b) range from between about 10 and 13. For thicker coatings of the coating composition of the present invention, a desirable post-conditioning thermal treatment is provided to enhance adhesion of the coating composition.

32 Claims, No Drawings

VAPOR PERMEATION CURABLE COATINGS FOR REACTION INJECTION MOLDED PARTS

BACKGROUND OF THE INVENTION

The present invention relates to vapor permeation curable coatings and more particularly for such coatings specially adapted for reaction injection molded parts.

Reaction Injection Moldings (RIM) are urethanes basically consisting of a polyol and a polyisocyanate, usually with an extender (eg. a glycol or a diamine), optionally with a blowing agent (eg. air), optional reinforcing material (eg. glass, mica, etc.), wetting agents, and the like, which materials are high pressure injected through a mixing head into a pre-heated mold with usual post-molding baking thereafter applied. RIM urethanes can range from low modulus to very high modulus material parts, foamed on the interior but with a smooth surface. RIM urethanes are capable of being made into very large one-piece parts which are very light in weight. Typical present-day uses of RIM parts include automobile parts (eg. bumpers, air deflectors, fenders, front ends, etc.), business machine housings, ski boots, office furniture, and a very wide variety of products. Further information on RIM urethanes can be found in the following references: "RIM urethanes coming on strong", *Product Engineering*, Morgan-Grampian Publishing Co. (June 1978); "Reaction injection molding", *Modern Plastics Encyclopedia* 1980–1981, pages 379–382, McGraw Hill, Inc.; "RIM: ready to move beyond Detroit", *Purchasing*, Cahners Publishing Company (Dec. 6, 1977); "Improving RIM technology multiplies the options", *Modern Plastics*, McGraw Hill, Inc., New York (1978); and "RIM Urethanes", *Plastics World*, Cahners Publishing Co. (May, 1981).

Especially for the automotive industry, such as for bumpers, since RIM urethane automotive parts are designed to flex on impact, such parts are painted with flexible paints. Existing commercial paints include, for example, melaminecured aliphatic urethane baking enamels, non-urethane melamine-acrylic enamels, 2-pack heat-cured urethanes, and urethane lacquers. Heating of these coatings for cure often damages the RIM urethane part. Such paints must possess a great deal of flexibility while maintaining adequate adhesion to the very smooth surface of the RIM part. Further, the coating must possess good solvent resistance, especially for an automobile bumper which is exposed to gasoline, for example, water and humidity resistance, salt-spray resistance, resistance to discoloration in sunlight, and additional performance requirements.

The coatings of the present invention not only meet or exceed performance requirements for RIM parts and especially for automobile parts such as bumpers, but are cured rapidly at room temperature.

BROAD STATEMENT OF THE INVENTION

The present invention is directed to a surface coating composition especially adapted for coating flexible RIM urethane parts, upholstery vinyl, and the like. The coating composition is rapidly curable at room temperature in the presence of a vaporous tertiary amine catalyst and possesses a pot life of at least about 4 hours in an open pot. Such coating composition comprises: the reaction product of (a) a linear aliphatic dibasic acid, (b) a linear aliphatic glycol, where the sum of the methylene groups of (a) and (b) is between 10 and 13 and where up to one-half of (a) or (b) can be replaced with a $C_6$–$C_8$ cycloaliphatic dicarboxylic acid or diol, respectively, (c) a combination of a linear aliphatic glycol and an aromatic dicarboxylic acid, or a bis(hydroxyalkyl) adduct of an aromatic diol and a linear aliphatic dicarboxylic acid, (d) a phenolic capping agent, where said resin has a molecular weight of about 1,000–4,000, an equivalent weight (solids) of about 250–1,000, preferably an aromatic weight content of at least about 30%, and substantially no aliphatic hydroxyl groups. The second ingredient of the coating composition is a multi-isocyanate preferably containing between about 10% and 80% by weight of an aromatic multi-isocyanate and between about 90% and 20% by weight of an aliphatic multi-isocyanate. The foregoing aromatic hydroxylterminated resin and multi-isocyanate curing agent are dispersed in an organic solvent therefor which preferably is a volatile organic solvent. The ratio of aromatic hydroxyl equivalents of said resin to the isocyanate equivalents of the multi-isocyanate curing agent is between about 1:1 and 1:2.

DETAILED DESCRIPTION OF THE INVENTION

RIM urethane parts, upholstery vinyl, and similar substrates require surface protective coatings which are extremely flexible even at very heavy film thicknesses (eg. up to and exceeding 1.25 mils per coat and up to 4 mils total with multiple coats) and at very low temperatures (eg. down to $-30°$ C. and lower) with a minimum sacrifice in toughness and mar resistance. As with all coatings, a balance of properties must be struck in order to achieve diverse properties which are mandatory therefor. The coating composition of the present invention possesses the foregoing flexibility properties while maintaining adequate toughness and mar resistance and providing unexpected resistance to immersion in water, humidity resistance, solvent resistance, and a variety of similar properties. Even more unexpectedly, the preferred coating composition has been determined to be quite satisfactory for coating relatively rigid sheet molding compound (SMC) according to commonly-assigned application U.S. Ser. No. 06/270,896, filed June 5, 1981.

Besides the excellent properties which the coating system of the present invention possesses, the coating can be cured at room temperature which provides a special economic savings during these energy-conscious times. Such room temperature cure also virtually eliminates any chance of thermal damage and degradation which conventional heat cured coatings often impose on RIM urethane parts, upholstery vinyl, and similar heat-sensitive substrates. The coating system of the present invention can be cured in as short a time as a few seconds on up to 15–30 seconds or longer for thin films (eg. up to 0.5 mils). For thicker films (eg. 1.5 mils) curing times of 30–60 seconds and longer usually are required. Thereafter, the coating is tack free and does not block so that the coated part can be immediately handled for packaging and/or further processing, eg. the preferred thermal conditioning step for thick films. Moreover, the use of vapor permeation curing for the present coating eliminates the need for capital-intensive equipment such as required for ultra-violet radiation curing. Despite the rapid cure times which are required for curing a film of the coating composition of the present invention, the polyol resin and isocyanate crosslinking agent dispersed in a volatile organic solvent therefor possesses an excellent pot life usually in the absence of pot life extender additives. Pot lives for the coating composition of the present invention often can range up to days and even weeks in the absence of the tertiary amine catalyst. The expediency of commercial utilization of the present coating composition having such extended pot life clearly can be appreciated.

The first component of the coating composition is an aromatic hydroxyl-terminated linear condensation product (hereinafter referred to as polyol or polyol resin) which desirably has an acid number of less than about 10. The polyol resin should contain substantially no aliphatic hydroxyl groups as aliphatic groups decrease the pot life of the composition. The ingredients of the polyol resin have been chosen in order to confer desired properties required of the coating composition especially adapted for the coating of RIM urethane parts, upholstery vinyl, and similar materials. The first ingredient of the polyol resin is a linear aliphatic dibasic acid possessing between 4 and 8 methylene groups in the linear chain. The second ingredient is a glycol having between 4 and 8 methylene groups in the linear chain thereof. The total number of methylene groups in the linear aliphatic dibasic acid and glycol should be between about 10 and 13. Diacids and glycols of too many methylene groups may tend to cause a resin which is waxy and cheesy. Further, too regular a structure may tend to give crystallinity to the resin which may not be desired. It is possible to replace up to about one-half of the diacid or glycol content with a $C_6$-$C_8$ cycloaliphatic diacid or diol in order to improve compatibility of the polyol resin with organic solvents and with the multi-isocyanate cross-linking agent therefor at the expense of some flexibility in the resin backbone. It is possible also to interrupt the methylene chains with linkages of ether or the like for achieving extra flexibility at the expense of water resistance or other desired property. Also, light substitution (branching) is possible at the expense of increased viscosities.

The next ingredients in the polyol resin are a combination of a linear aliphatic glycol and an aromatic dicarboxylic acid, or bis(hydroxyalkyl) adduct of an aromatic diol and a linear aliphatic dicarboxylic acid. The aromatic dicarboxylic acid or anhydride thereof has a ring structure which provides hardness, resistance to water and chemicals, and durability to the coating composition. Resistance to sun or ultra-violet radiation is enhanced also probably because of the energy dissipation due to the double bond isomerization in the structure. The meta-structure or isophthalic acid is preferred because it confers more stable ester linkages. The para structure or terephthalic acid also is quite acceptable. Linear aliphatic glycols usually will range from $C_4$-$C_8$ glycols. Suitable aromatic diols conceivably can be catechol, resorcinol, or hydroquinone, though such diols tend to be rather recalcitrant to esterification under conventional polyesterification conditions. Accordingly, one preferably may form an hydroxy alkyl adduct thereof by reaction with ethylene oxide, propylene oxide or similar oxirane compounds, eg. the adduct of ethylene glycol and dihydroquinone. Linear aliphatic acids usually will range from $C_6$-$C_{10}$ dicarboxylic acids. Of course, other modifications of such bis(hydroxyalkyl) adduct of aromatic diols (eg. bis-phenol A) and diacids are conceivable as those skilled in the art will appreciate. Desirably only 1-2 moles per molecule of the aromatic ingredient is used and preferably only about 1 mole.

Of course, further modifications of the aromatic-hydroxy resin or polyol resin can be made within the spirit of the present invention. For example, a portion of the linear aliphatic dibasic acid may be replaced with an ethylenically unsaturated dicarboxylic acid, eg. fumaric acid, for achieving special affects, such as the use of an ethylenically unsaturated solvent for additional linking with the ethylenic unsaturation of the polyol resin. Finally, a phenolic-capping agent which provides pendant or terminal aromatic hydroxyl groups for the polyol is utilized therein. While the functional reactivity on the phenolic capping agent which links such agent into the polyol conceivably could be hydroxyl, amine, unsaturation or the like, providing that the groups reacted therewith are included in the other ingredients of the polyol, preferably such functional reactivity is a carboxyl group for providing a phenolic-functional carboxylic acid (or ester) capping agent. Note that all carboxylic acid ingredients of the polyol could be esters (or anhydrides where appropriate) and such esters used to incorporate the ingredient into the polyol.

Advantageous phenolic-functional carboxylic acids for use in the present invention can be represented conventionally by the following general structure:

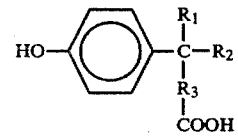

where
$R_1$ is hydrogen, an aromatic group, or an aliphatic group,
$R_2$ is hydrogen, an aromatic group, an aliphatic group, or a phenolic group, and
$R_3$ is a divalent organic radical or a sigma bond,
$R_1$ preferably is an H or alkyl group, $R_2$ preferably is a phenolic group, and $R_3$ preferably is a sigma bond or a divalent $C_1$-$C_8$ polymethylene group, optionally substituted with $C_1$-$C_8$ alkyl groups. Thus, the preferred phenolic-functional carboxylic acids can be represented conventionally as follows:

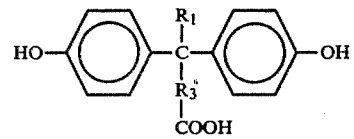

where:
$R_1$ is an H, $C_1$-$C_8$ alkyl group,
$R_3$ is a sigma bond or a $C_1$-$C_8$ polymethylene group.
Representative preferred difunctional phenol capping agents include, for example, diphenolic acid, bis-phenol acetic acid, and monofunctional phenol capping agents such as p-hydroxyphenyl acetic acid, and the like.

The proportion of phenol capping agent in the polyol is sufficient to provide desirably at least two phenol groups pendantly attached to the resin or terminating either end of the essentially linear structure of the polyol resin. While it is conceivable that a single phenol group can terminate one end of the chain, resins formulated in such a manner have yet to meet current industry criteria for such coatings on RIM urethane automotive parts and, hence, such embodiment is not preferred. Note that such polyols could be valuable blending agents in the coating formulations. Synthesis of the polyol is conventional so that little more need be said about it. It should be noted, though, that on occasion it may be preferred to conduct the polyesterification reaction with all of the listed ingredients except the phenol capping agent to produce a polyester having an acid number of less than about 10 and then add the phenol capping agent in order to ensure its placement at the terminal end of the linear chain for providing the preferred aromatic hydroxyl functionality and to minimize its exposure to higher esterification temperatures.

The preferred polyol of the present invention has a molecular weight broadly ranging from about 1,000–4,000 and preferably between about 2,000 and 3,000. The polyol should have an equivalent weight (solids) ranging from between about 500 and 750 though such equivalent weight broadly can range from about 250–1,000. It is desired also that at least 30% of the molecular weight of the polyol should be aromatic including the phenol capping agent portion of the resin. As noted above, also, aliphatic hydroxyl groups should not be present in the resin as they decrease pot life of the composition.

Multi-isocyanate cross-linking agents cross link with the aromatic hydroxyl groups of the resulting adduct-capped polymer under the influence of a vaporous tertiary amine to form urethane linkages and to cure the coating. Aromatic isocyanates are necessary in order to obtain the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions find utility in the invention. Multi-isocyanates preferably will have from about 2–4 isocyanate groups per molecule for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p- phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6XDI$), dicyclohexylmethane diisocyanate ($H_{12}MDI$), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of aromatic hydroxyl equivalents from the phenol-functional compound to the isocyanate equivalents of the multi-isocyanate cross-linking agent should preferably be greater than 1:1 and can range on up to about 1:2. The precise intended application of the coating composition often will dictate this ratio or isocyanate index. At high cross-linking densities or isocyanate equivalents, harder but relatively inflexible films are produced while at lower cross-linking densities or isocyanate equivalents flexibility of the films increases. Optimizing the particular property or combination of properties desired can be determined as those skilled in this art will appreciate.

The solvent or vehicle for the coating composition is a volatile organic solvent mixture which preferably includes ketones and esters for minimizing viscosity of the composition. Some aromatic solvents may be necessary and typically are a part of the volatiles in commercial isocyanate polymers. For the polyol resin, suitable solvents include, for example, methyl ethyl ketone, acetone, methyl isobutyl ketone, ethylene glycol monoethyl ether acetate (sold under the trademark Cellosolve acetate) and the like. Some solvents can be too volatile so that mixtures may be preferred. For the polyisocyanate, conventional commercially available solvents therefor include toluene, xylene, Cellosolve acetate, and the like. Such aromatic solvents are quite compatible with the preferred ketone and ester solvents for the polyester resin when the two packages are mixed together in the pot. Sufficient solvent usually is added in order to bring the non-volatile solids content of the coating composition down to about 50–80% by weight for achieving a practical application viscosity, depending upon pigmentation. It should be noted that the effective non-volatile solids content of the coating composition can be increased by incorporation of a relatively low or non-volatile (high boiling) ester plasticizer which is retained for the most part in the cured film. Suitable such ester plasticizers include, for example, dibutyl phthlate, di(2-ethylhexyl) phthlate [DOP], and the like. The proportion of ester plasticizer should not exceed about 5–10% by weight, otherwise loss of mar resistance can occur.

As to the performance requirements which are met by the coating composition, it should be noted the coating composition, polyol resin and isocyanate crosslinking agent, have a minimum pot life of at least 4 hours in an open pot and generally the pot life exceeds 8 hours and can range up to 18 hours and more. Such long pot lives means that refilling the pot at the plant during shifts generally is not required. Moreover, the pot life of the coating composition in a closed container generally exceeds one month. After storage of the coating composition, the stored composition can be cut to application viscosity with suitable solvent and such composition retains all of the excellent performance characteristics which it initially possessed. Such long pot lives means that it is unnecessary to use a two-head spray unit for applying the coating composition.

Additional ingredients which suitably can be incorporated into the coating composition of the present invention include tinctorial pigments, plasticizers, flatting agents, flow leveling agents, and a wide variety of conventional paint additives.

The coating composition of the present invention can be cured in the presence of a vaporous tertiary amine such as, for example, triethyl amine, dimethyl ethyl amine, cyclohexyl dimethyl amine, methyl diethyl amine, and the like, by exposure thereto for times ranging from as short as 5 seconds on up to 30 seconds or longer (eg. about 2 minutes). The coating composition thus cured may be immediately handled without fear of deleterious tackiness or blocking of the cured film.

In practicing the present invention, the coating composition is applied to the substrate by direct roll coat or curtain coating with or without knife, reverse roller coat, atomized application, or like conventional technique. Use of a two-head spray equipment is unnecessary since the coating composition of the present invention possesses such an excellent pot life. After the film is applied to the substrate, the coated substrate is passed through a zone or region which contains the vaporous tertiary amine. Representative vapor curing chambers for vapor curing the coating include those shown in U.S. Pat. Nos. 3,851,402 and 3,931,684, the disclosures of which are expressly incorporated herein by reference. The vaporous tertiary amine often is admixed with a carrier gas, such as an inert gas like nitrogen or carbon dioxide, in order to facilitate its dispersion in the curing chamber as well as for minimizing the chance of flammability. The saturated atmosphere in the curing chamber normally will contain the vaporous tertiary amine in a proportion (by volume) of between about 2% and 12% with catalyst concentrations somewhere in the range of 4-8% being preferred. Concentrations above about 6% appear to be advantageous for thicker films. Room temperature may be maintained during the entire sequence of operations from coating, to curing of the coated substrate.

For thin (eg. up to about 0.5-1.0 mil) coatings vapor permeation cure is adequate for providing a cured coating. Since volatile organic solvent appears to be trapped in the cured film, a post-conditioning period (eg. storage at ambient indoor temperature) of several hours on up to 1-3 days permits much, if not most, of such trapped solvent to be expelled (eg. by evaporation) from the film. Also, residual curing can take place during this post-conditioning period. Note that the film's outward or apparent appearance is of a smooth, non-blocking, tack-free coating during this post-conditioning period. For thicker films or multiple layers of films, even more solvent may remain in the film. Moreover, permeation of the vaporous catalyst into the film is necessary for cure, and solvent absorbence and transfer of the catalyst in the film is believed to be necessary for such cure. Thicker films, then, not only usually require longer catalyst exposure times, but often may require enhancement of or a boost to the conditioning step.

Such post-conditioning enhancement most readily is accomplished by thermal means. That is, the vapor permeation cured coating is exposed to low to moderate heat (eg. about 50°-150° C. desirably) for a short time (eg. about 1-3 minutes desirably). Of course increased heating temperatures usually means shorter treatment times and vice versa. Advantageous conditions are a temperature of about 120° C. for about 1 minute for a 1-4 mil coating cured by 1 minute exposure to a vaporous amine catalyst. Such heat conditioning or treatment is practiced under conditions far short of those (eg. time and temperature) necessary for heat curing an isocyanate/polyol coating, especially since no catalyst is added during such conditioning. It is postulated that such thermal conditioning accelerates solvent expulsion from the film and may (to a degree) boost the activity of an absorbed vaporous tertiary-amine catalyst to promote residual cure in the film, especially deeper into the film towards and adjacent the substrate. Increased adhesion of thicker films is gained by such thermal after-treatment.

The performance requirements in addition to those noted above include excellent impact resistance, resistance to being pitted by gravel, humidity and water soak resistance, and additional desirable requirements. Moreover, the coating composition can withstand several hundred flexes and still maintain a visibly continuous film of apparent integrity often requiring a microscope in some instances to discern micro-cracking. These advantages of the present invention and others can be seen in the following examples which show how the present invention can be practiced, but should not be construed as limiting. In this application, all units are in the metric system and all proportions and parts are by weight, unless otherwise expressly indicated. Also, all references cited herein are expressly incorporated herein by reference.

EXAMPLES

EXAMPLE 1

A series of phenol-functional resins were synthesized under conventional polyesterification conditions as follows:

| Ingredient | RESIN NO. (moles) | | | | |
|---|---|---|---|---|---|
| | 98 | 100 | 180 | 120 | 121 |
| Iso-Phthalic Acid | 1 | 1 | 1 | — | 1 |
| Azelaic Acid | 6 | 6 | 6 | 6 | 6 |
| 1,4 Butane Diol | 8 | 4 | 4 | 8 | — |
| Cyclohexanedimethanol | — | 4 | 4 | — | — |
| p-Hydroxyphenylacetic Acid | — | — | 1 | — | — |
| Diphenolic Acid | 2 | 2 | 1 | 2 | 2 |
| Terephthalic Acid | — | — | — | 1 | — |
| 1,6-Hexane Diol | — | — | — | — | 8 |

All of the listed ingredients were reacted except for the diphenolic acid and para-hydroxyphenylacetic acid which were post reacted.

These polyol resins had the following properties:

| Property | RESIN NO. | | | | |
|---|---|---|---|---|---|
| | 98 | 100 | 180 | 120 | 121 |
| Molecular Wt. (theoretical) | 2066 | 2166 | 2032 | 2066 | 2290 |
| Equivalent Wt. (theoretical) | 738 | 772 | 977 | 738 | 818 |
| $\Sigma(CH_2)$/ester pair | 11 | 11 | 11 | 11 | 13 |
| Aromatic Content (wt. %)[1] | 33.8 | 32.2 | 34.4 | 33.8 | 30.5 |

[1]calculated by dividing the molecular weight of the aromatic monomer content by the molecular weight of the polyol resin.

EXAMPLE 2

The polyols of Example 1 were formulated into coating compositions as follows:

| Ingredient | COATING (g) | | | | |
|---|---|---|---|---|---|
| | 98 | 100 | 180 | 120 | 121 |
| Polyol | 71.1 | 77.3 | 162.61 | 84.2 | 70.6 |
| Curing Agent[1] | 40.2 | 40.2 | 40.2 | 40.2 | 40.2 |

-continued

| Ingredient | COATING (g) | | | | |
|---|---|---|---|---|---|
| | 98 | 100 | 180 | 120 | 121 |
| Cellosolve Acetate[(2)] | 40.0 | 55.0 | 150.0 | 60.0 | 30.0 |

[(1)]Mixture of Mondur HC isocyanate and Desmodur L-2291A isocyanate (160:26 parts by weight ratio respectively); Mondur HC isocyanate is the tetrafunctional reaction product of hexamethylene diisocyanate and toluene diisocyanate (11.5% NCO content, equivalent weight of 365, 60% solids in Cellosolve acetate/xylene), Mobay Chemical Company, Pittsburgh, Pa. Desmodur L-2291A isocyanate is an aliphatic polyfunctional isocyanate of the hexamethylene diisocyanate biuret type, Mobay Chemical Company, Pittsburgh, Pa.
[(2)]Cellosolve acetate (urethane grade) is ethylene glycol monoethyl ether acetate, Union Carbide Corporation, New York, New York.

The coating compositions were coated on glass plates with a Meyer bar and cured by exposure to vaporous triethylamine catalyst carried by $N_2$ or $CO_2$ carrier gas (about 7% catalyst by volume) in a gas curing chamber to give a 0.1–0.5 mil dry film. Viscosity measurements of the coating compositions were recorded as well as results of survey performance tests.

| Coating | Viscosity (cps) | | | | | Cure Time (sec.) | Sward[(1)] Hardness | | MEK Rub[(2)] | |
|---|---|---|---|---|---|---|---|---|---|---|
| | Initial | 4 hr. | 24 hr. | 48 hr. | 72 hr. | | RT[(3)] | (HT)[(4)] | RT | HT |
| 98 | 136 | 183.5 | 298.5 | 383.5 | 473.5 | 30 | 78 | 46 | 30 | 75 |
| 100 | 128.5 | 182 | 285 | 421.5 | 551 | 30 | 54 | 46 | 57 | 22 |
| 180 | 134 | 138 | 176 | 222 | 281 | 60 | 12 | 10 | 7 | 6 |
| 120 | 132.5 | 218.5 | 275 | 404 | 486 | 20 | 30 | 30 | 23 | 27 |
| 121 | 131.5 | 192.5 | 338.5 | 669 | 1067.5 | 20 | 28 | 30 | 14 | 10 |

[(1)]Plate glass is defined as 100 for Sward Hardness.
[(2)]Methyl ethyl ketone (MEK) wetted rag rubbed over one area of cured film with moderate thumb pressure until glass substrate is visible.
[(3)]RT is room temperature.
[(4)]HT: Samples held at 160° C. for 5 minutes after vaporous amine catalyst exposure, then allowed to cool for 3 days at room temperature prior to testing.

| | SOLVENT RESISTANCE[(1)] | | | | | | | |
|---|---|---|---|---|---|---|---|---|
| | $H_2O$ | | 5% NaOH | | 10% $H_2SO_4$ | | Xylene | |
| Coating | RT | HT | RT | HT | RT | HT | RT | HT |
| 98 | Pass | Pass | Fail | Pass | Pass | Pass | Pass | Pass |
| 100 | Pass | Pass | Fail | Fail | Pass | Pass | Pass | Pass |
| 180 | Pass | Pass | Fail | Fail | Fail | Fail | Pass | Pass |
| 120 | Pass | Pass | Fail | Fail | Pass | Pass | Pass | Pass |
| 121 | Pass | Pass | Fail | Fail | Pass | Pass | Pass | Pass |

[(1)]The indicated solvent in a pool on the coating is placed under a watch glass for 24 hours at ambient indoor temperature (RT) or at 160° C. (HT) and then the solvent resistance of the coating is judged.

The above-tabulated data demonstrate the excellent pot life and cure of the coatings composition. Coatings 98, 100 and 120 appear to achieve a good balance of properties as candidate coatings for RIM urethanes or other substrates. Coating 180 is considerably softer, but shows considerable promise on flexible RIM. Coating 121 appears to be intermediate. Different isocyanate curing agents contribute to different performance properties for all the polyols evaluated. Flexibility is enhanced as the methylene chains are extended, (98 vs. 121); as the functionality is decreased (98 vs. 180) and in going from meta to para isomerization (98 vs. 120). Preferably Mondur HC is replaced on a 25–50% equivalency basis.

EXAMPLE 3

Several coating compositions were coated with a #60 wire wound (Meyer) draw-down rod onto RIM urethane sheets (supplied by Ford Motor Co.) and cured as described in the previous examples. The coating compositions were formulated similarly to those of Example 2 except that the curing agent was a blend (equal isocyanate equivalents) of Mondur HC and Desmodur KL5-2444 (an isocyanurate of hexamethylene diisocyanate, equivalent weight of 210, an NCO content of 20, 90% solids, Mobay Chemical Company). The isocyanate index of the coatings was 1.0:1.1 (OH:NCO molar ratio). The coatings each were about 3 mils thick (dry).

The coated RIM urethane sheets were placed in a dry ice bath to lower the temperature of the sheets to 0° C. The sheets then were removed from the bath and placed on an impacting head which was sitting on dry ice. As soon as the temperature of the coating surface was measured to be 0° C., a reverse impact test was initiated with the sheet on the cold head which was on the dry ice. The following results were obtained.

| Coating (Resin No.) | Reverse Impact at 0° C. (Kg/cm) |
|---|---|
| 98 | Fails at 125 |
| 180 | Passes 200 |
| 120 | Passes 200 |
| 121 | Passes 200 |

The above-tabulated data demonstrates the excellent flexibility which the inventive coatings possess and the excellent adhesion of the coatings to RIM urethane. Note that the RIM urethane sheets shatter at −10° C. The influence of the curing agent on the coatings' performance is believed to be apparent in these tests. Based on these and other tests it presently is preferred to use the Desmodur KL5-2444 as part of the curing agent.

I claim:
1. A coating composition rapidly curable at room temperature in the presence of vaporous tertiary amine catalyst and possessing a pot life of at least about 4 hours in an open pot, comprising:
   (1) an aromatic hydroxyl-functional condensation product made by condensing the following ingredients:
      (a) a linear aliphatic dibasic acid;
      (b) a linear aliphatic glycol,
   where the sum of the methylene groups of (a) and (b) is between 10 and 13 and where up to about one-half of (a) or (b) can be replaced with a $C_6$–$C_8$ cycloaliphatic dibasic acid or diol;
      (c) the combination of a linear aliphatic glycol and aromatic dicarboxylic acid, or a bis(hydroxyalkyl) adduct of an aromatic diol and a linear aliphatic dicarboxylic acid,
      (d) a phenol capping agent,
   where said condensation product (1) has a molecular weight of between about 1,000 and 4,000 an equivalent

(solids) weight of between about 250 and 1,000, and substantially no aliphatic hydroxyl groups;

(2) a multi-isocyanate curing agent;
(3) a volatile organic solvent for said aromatic hydroxyl-functional condensation product and for said multi-isocyanate curing agent, the ratio of aromatic hydroxyl equivalents of said condensation product to the isocyanate equivalents of said multi-isocyanate being between about 1:1 and 1:2.

2. The coating composition of claim 1 wherein said linear aliphatic dibasic acid (1)(a) is a $C_6$-$C_{10}$ linear aliphatic dibasic acid and said linear aliphatic glycol (1)(b) is a $C_4$-$C_8$ glycol.

3. The coating composition of claim 2 wherein the number of methylene groups of said linear aliphatic dibasic acid (1)(a) does not equal the number of methylene groups in said linear aliphatic glycol (1)(b).

4. The coating composition of claim 1 wherein said combination (1)(c) is of a linear aliphatic glycol and an aromatic dicarboxylic acid wherein said aromatic dicarboxylic acid is isophthalic acid or terephthalic acid, and said linear aliphatic glycol is a $C_4$-$C_6$ glycol.

5. The coating composition of claim 4 wherein said linear aliphatic dibasic acid (1)(a) is azelaic acid and said linear aliphatic glycol (1)(b) is a $C_4$ glycol.

6. The coating composition of claim 1 wherein said phenol capping agent (1)(d) is represented by:

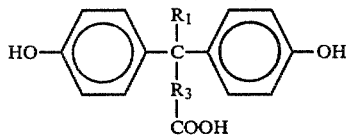

where:
$R_1$ is an H, $C_1$-$C_8$ alkyl group,
$R_3$ is a sigma bond or a $C_1$-$C_8$ polymethylene group.

7. The coating composition of claim 6 wherein for said diphenolic acid, $R_2$ equals $CH_3$ and $R_3$ is —$CH_2$—$CH_2$—.

8. The coating composition of claim 6 wherein said phenol capping agent is selected from diphenolic acid or bisphenol acetic acid.

9. The coating composition of claim 1 wherein said condensation product (1) has a molecular weight of between about 2,000 and 3,000 and an equivalent (solids) weight of between about 500 and 750.

10. The coating composition of claim 1 wherein said aromatic hydroxylfunctional condensation product has an aromatic content of at least about 30% by weight of said condensation product.

11. The coating composition of claim 1 wherein said aromatic hydroxylfunctional condensation product is made by condensing the following ingredients: 1 mole of isophthalic acid, 6 moles of azelaic acid, 8 moles of 1,4 butanediol, and 2 moles of diphenolic acid.

12. The coating composition of claim 1 wherein said aromatic hydroxyl functional condensation product is made by condensing the following ingredients: 1 mole of isophthalic acid, 6 moles of azelaic acid, 4 moles of 1,4 butanediol, 4 moles of cyclohexane dimethanol, and 2 moles of diphenolic acid.

13. The coating composition of claim 1 wherein said aromatic hydroxyl functional condensation product is made by condensing the following ingredients: 6 moles of azelaic acid, 8 moles of 1,4 butanediol, 1 mole of terephthalic acid, and 2 moles of diphenolic acid.

14. The coating composition of claim 1 wherein said aromatic hydroxyl functional condensation product is made by condensing the following ingredients: 1 mole of isophthalic acid, 6 moles of azelaic acid, 9 moles of 1,6-hexane diol, and 2 moles of diphenolic acid.

15. The coating composition of claim 1 wherein said multi-isocyanate curing agent comprises between about 10 and 80% by weight of an aromatic multi-isocyanate and between about 90 and 20% by weight of an aliphatic multi-isocyanate.

16. The coating composition of claim 1 wherein said ratio of aromatic hydroxyl equivalents of said condensation product of the isocyanate equivalents of said multi-isocyanate is between about 1:1.1 and 1:1.7.

17. The coating composition of claim 1 wherein said volatile organic solvent comprises a ketone, a carboxylic acid ester, an aromatic solvent, or mixtures thereof.

18. A method for coating a substrate with a film of a coating composition rapidly curable at room temperature in the presence of a vaporous tertiary amine catalyst and possessing a pot life of at least about 4 hours in an open pot, which comprises:

(A) applying a film of said coating composition to said substrate, said coating composition comprising:
(1) an aromatic hydroxyl-functional condensation product made by condensing the following ingredients:
(a) a linear aliphatic dibasic acid;
(b) a linear aliphatic glycol,
where the sum of the methylene groups of (a) and (b) is between 10 and 13 and where up to about one-half of (a) or (b) can be replaced with a $C_6$-$C_8$ cycloaliphatic dibasic acid or diol;
(c) the combination of a linear aliphatic glycol and aromatic dicarboxylic acid, or an aromatic diol and a linear aliphatic dicarboxylic acid,
(d) a phenol capping agent,
where said condensation product (1) has a molecular weight of between about 1,000 and 4,000, an equivalent (solids) weight of between about 250 and 1,000, and substantially no aliphatic hydroxyl groups;
(2) a multi-isocyanate curing agent;
(3) a volatile organic solvent for said aromatic hydroxyl-functional condensation product and for said multi-isocyanate curing agent,
the ratio of aromatic hydroxyl equivalents of said condensation product to the isocyanate equivalents of said multi-isocyanate being between about 1:1 and 1:2,
(B) exposing said coated substrate to a vaporous tertiary amine catalyst to rapidly cure said coating at about room temperature.

19. The method of claim 18 wherein said substrate is selected from sheet molding compound, reaction injection molding urethane, and upholstery vinyl.

20. The method of claim 19 wherein said substrate is selected from reaction injection molding urethane and upholstery vinyl.

21. The method of claim 18 or 20 wherein said coating thickness of said film of said coating composition or multiple films of said coating composition range in thickness from between about 1 and 4 mils, and said vaporous tertiary amine-cured film of said coating composition on said substrate is subjected thereafter to a thermal conditioning step comprising maintaining said cured film at a temperature of between about 50° and 150° C. for a time ranging from between about 1 and 3 minutes.

22. The method of claim 21 wherein said thermal conditioning is practiced at about 120° C. for about 1 minute.

23. The method of claim 18 wherein said linear aliphatic dibasic acid (1)(a) is a $C_6$-$C_{10}$ linear aliphatic dibasic acid and said linear aliphatic glycol (1)(b) is a $C_4$-$C_8$ glycol.

24. The method of claim 18 wherein said combination (1)(c) is of a linear aliphatic glycol and an aromatic dicarboxylic acid wherein said aromatic dicarboxylic acid is isophthalic acid or terephthalic acid, and said linear aliphatic glycol is a $C_4$-$C_6$ glycol.

25. The method of claim 24 wherein said linear aliphatic dibasic acid (1)(a) is azelaic acid and said linear aliphatic glycol (1)(c) is a $C_4$ glycol.

26. The method of claim 18 wherein said catalyst is selected from triethyl amine, dimethyl ethyl amine, cyclohexyl dimethyl amine, and methyl diethyl amine.

27. A composite article comprising a substrate selected from reaction injection molding urethane and upholstery vinyl having an adherent cured film of a curable coating composition thereon, said film at a thickness of between about 1 and 4 mils, said film being the cured residue of said coating composition after exposure to a vaporous tertiary amine catalyst, said coating composition comprising:
   (1) an aromatic hydroxyl-functional condensation product made by condensing the following ingredients:
      (a) a linear aliphatic dibasic acid;
      (b) a linear aliphatic glycol,
   where the sum of the methylene groups of (a) and (b) is between 10 and 13 and where up to about one-half of (a) or (b) can be replaced with a $C_6$-$C_8$ cycloaliphatic dibasic acid or diol;
      (c) the combination of a linear aliphatic glycol and aromatic dicarboxylic acid, or a bis(hydroxyalkyl) adduct of an aromatic diol and a linear aliphatic dicarboxylic acid,
      (d) a phenol capping agent,
   where said condensation product (1) has a molecular weight of between about 1,000 and 4,000 an equivalent (solids) weight of between about 250 and 1,000, and substantially no aliphatic hydroxyl groups;
   (2) a multi-isocyanate curing agent;
   (3) a volatile organic solvent for said aromatic hydroxyl-functional condensation product and for said multi-isocyanate curing agent,
the ratio of aromatic hydroxyl equivalents of said condensation product to the isocyanate equivalents of said multi-isocyanate being between about 1:1 and 1:2.

28. The composite article of claim 27 wherein said substrate comprises reaction injection molding urethane.

29. The composite article of claim 27 wherein said linear aliphatic dibasic acid (1)(a) is a $C_6$-$C_{10}$ linear aliphatic dibasic acid and said linear aliphatic glycol (1)(b) is a $C_4$-$C_8$ glycol.

30. The composite article of claim 27 wherein said combination (1)(c) is of a linear aliphatic glycol and an aromatic dicarboxylic acid wherein said aromatic dicarboxylic acid is isophthalic acid or terephthalic acid, and said linear aliphatic glycol is a $C_4$-$C_6$ glycol.

31. The composite article of claim 30 wherein said linear aliphatic dibasic acid (1)(a) is azelaic acid and said linear aliphatic glycol (1)(b) is a $C_4$ glycol.

32. The composite article of claim 28 wherein said aromatic hydroxylfunctional condensation product is made by condensing the following ingredients: 1 mole of isophthalic acid, 6 moles of azelaic acid, 8 moles of 1,4 butanediol, and 2 moles of diphenolic acid.

* * * * *